(12) United States Patent
Antolinos

(10) Patent No.: US 12,190,190 B2
(45) Date of Patent: Jan. 7, 2025

(54) SYSTEM FOR PAIRING AN ITEM OF DATA OF A UWB TRANSMITTER DEVICE AND A TAG COMPRISING A GRAPHIC CODE

(71) Applicant: APITRAK SAS, Meylan (FR)

(72) Inventor: Luc Antolinos, Toulouse (FR)

(73) Assignee: APITRAK SAS, Meylan (FR)

( * ) Notice: Subject to any disclaimer, the term of this patent is extended or adjusted under 35 U.S.C. 154(b) by 0 days.

(21) Appl. No.: 18/245,100

(22) PCT Filed: Sep. 17, 2021

(86) PCT No.: PCT/EP2021/075714
§ 371 (c)(1),
(2) Date: Mar. 13, 2023

(87) PCT Pub. No.: WO2022/058559
PCT Pub. Date: Mar. 24, 2022

(65) Prior Publication Data
US 2023/0385594 A1    Nov. 30, 2023

(30) Foreign Application Priority Data

Sep. 18, 2020   (FR) ...................................... 2009473

(51) Int. Cl.
*G06K 19/08* (2006.01)
*G06K 7/00* (2006.01)
(Continued)

(52) U.S. Cl.
CPC ......... *G06K 19/08* (2013.01); *G06K 19/0776* (2013.01)

(58) Field of Classification Search
CPC ............ G06Q 20/352; G06Q 30/0643; G06Q 10/0833; G06K 19/06028; G06K 7/10722;
(Continued)

(56) References Cited

U.S. PATENT DOCUMENTS 6,371,375 B1 * 4/2002 Ackley ................ G06K 7/0008
235/462.46
11,201,981 B1 * 12/2021 Suiter ................ G06Q 30/0639
(Continued)

FOREIGN PATENT DOCUMENTS

EP         2539847 A2 *  1/2013   ............. G06F 21/32
FR       2 717 593 A1      9/1995
(Continued)

OTHER PUBLICATIONS

Choi, "A Pairing Algorithm of Range Information Between Multiple IR-UWB Radar Sensors" (Year: 2016).*
(Continued)

*Primary Examiner* — Thien T Mai
(74) *Attorney, Agent, or Firm* — Pillsbury Winthrop Shaw Pittman LLP

(57) ABSTRACT

A system intended to perform a pairing of at least one first tag including a graphic code and a UWB radio transmitter device including a UWB radio transmission module and a UHF radio reception module to collect signals in order to electrically power the UWB transmission module, the transmitter device including a support including a zone delimiting a geometric contour making it possible to visually read the graphic code of the first tag when the transmitter device is superimposed on the first label, the system including a pairing device including a reader of the first graphic code and a UWB receiver to receive the UWB signal transmitted by the transmitter device, the pairing device including a memory.

10 Claims, 1 Drawing Sheet

Figure 1:
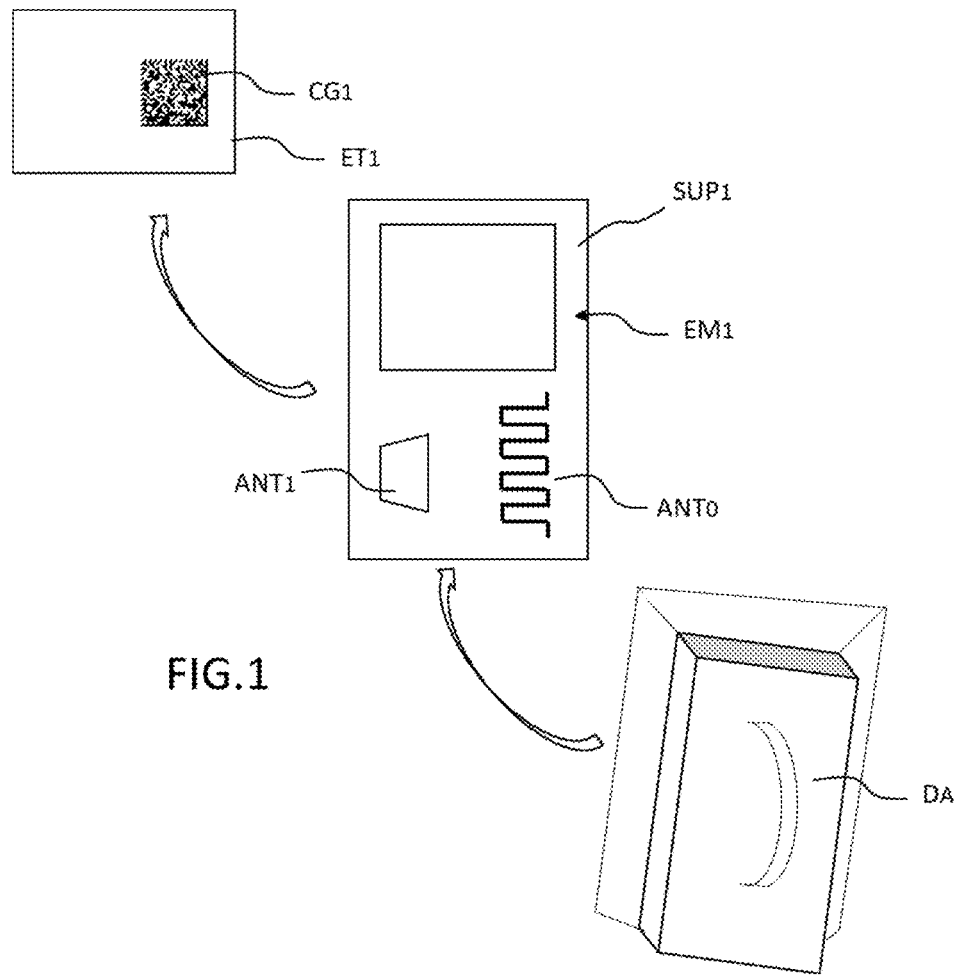

(51) Int. Cl.
  *G06K 17/00* (2006.01)
  *G06K 19/077* (2006.01)
(58) Field of Classification Search
  CPC ........ G06K 7/12; G06K 7/08; G06K 19/0776;
    G06K 19/07762; G06K 19/07764; G06K
    19/07767; G06K 19/07766; G06K
    19/07783; G06K 19/07784; G06T 19/006;
    H04W 12/50; H04W 12/55
  See application file for complete search history.

(56) References Cited

U.S. PATENT DOCUMENTS

| | | | |
|---|---|---|---|
| 2003/0057276 A1 | 3/2003 | Appalucci et al. | |
| 2008/0105746 A1* | 5/2008 | Lei | G06K 7/10722 |
| | | | 235/462.11 |
| 2008/0246613 A1* | 10/2008 | Linstrom | G08B 13/19695 |
| | | | 340/572.4 |
| 2016/0004953 A1* | 1/2016 | Karani | G06K 19/07758 |
| | | | 235/492 |
| 2017/0011606 A1* | 1/2017 | Ceccon | G07G 1/0054 |
| 2018/0150731 A1* | 5/2018 | Bryan | G06K 19/06028 |
| 2019/0043328 A1* | 2/2019 | Thomas | G08B 13/2402 |
| 2020/0143221 A1* | 5/2020 | Kwang | G06K 19/07758 |

FOREIGN PATENT DOCUMENTS

| | | |
|---|---|---|
| FR | 3 089 660 A1 | 6/2020 |
| WO | WO 2011/007260 A2 | 1/2011 |
| WO | WO-2018170576 A1 * | 9/2018 ......... H04L 63/0428 |

OTHER PUBLICATIONS

Fernandes, "Recent Advances in IR-UWB Transceivers:An Overview" (Year: 2010).*
International Search Report as issued in International Patent Application No. PCT/EP2021/075714, dated Nov. 25, 2021.

* cited by examiner

SYSTEM FOR PAIRING AN ITEM OF DATA OF A UWB TRANSMITTER DEVICE AND A TAG COMPRISING A GRAPHIC CODE

CROSS-REFERENCE TO RELATED APPLICATIONS

This application is the U.S. National Stage of PCT/EP2021/075714, filed Sep. 17, 2021, which in turn claims priority to French patent application number 2009473 filed Sep. 18, 2020. The content of these applications are incorporated herein by reference in their entireties.

FIELD OF THE INVENTION

The field of the invention relates to the field of UWB radio transmitter devices, of the radio tag type, comprising a UHF radio energy reception module to supply the electronic components of said transmitter device. The field of the invention relates to UWB transmitter devices when they are physically associated with a tag including a graphic code such as a QR code.

PRIOR ART

There are objects with radio labels of the RFID type or labels with a graphic code of the QR code type. However, when these objects enter an environment covered by a UWB radio location system, these objects should include a UWB transmitter to enable their identification and location. One problem is that it is necessary to make two types of tag exist on the same object which has no means of discovering each other.

There is a need to have these two systems co-exist while improving their mutual knowledge. An existing solution is to create a network gateway between the two systems by an architecture that allows the two systems to communicate. However, this architecture is complex to create and cannot be easily deployed each time an object transits from one environment to another.

SUMMARY OF THE INVENTION

According to one aspect, the invention relates to a system for performing a pairing of at least one first tag comprising a graphic code and a UWB radio transmitter device comprising a UWB radio transmission module and a UHF radio reception module for collecting signals for electrically supplying the UWB transmission module, said transmitter device comprising a support comprising a zone delimiting a geometric contour making it possible to visually read the graphic code of the first tag when the transmitter device is superimposed on the first tag, said system comprising a pairing device comprising a reader of said first graphic code and a UWB receiver to receive the UWB signal transmitted by the transmitter device, said pairing device comprising a memory to save a pair of values comprising a data specific to the graphic code and a data specific to at least one UWB signal received.

One advantage is to make it possible to pair a pre-existing tag on an object with a UWB transmitting device which does not, in principle, know the tag already affixed. This physical pairing performed directly on the object thanks to a third-party device, the pairing device, makes it possible to associate at least two identifiers: that of the tag comprising a graphic code and that of the UWB transmitter device.

According to one embodiment, the pairing device comprises a radio interface to receive a radio signal from an RFID chip. According to one example, the pairing device comprises a calculator making it possible to decode a radio signal of the RFID or other type and to save the decoded data, such as an identifier, in a memory.

Another advantage is to enable a conversion of a pre-existing graphic code and/or a radio identifier of the type coming from an RFID chip already saved in a database into a code that can be read by a UWB location system or by a system retrieving UWB data. A system retrieving UWB data may for example be a set of equipment comprising a data server that knows the UWB network and a Wifi network, for example. This possible pairing makes it easier to use the data specific to the identification of an object. Such pairing makes it possible to easily transit an object in an environment not covered by UWB radiation to an environment under UWB coverage.

According to one embodiment, the pairing device comprises an optical reader for decoding a 1D or 2D graphic code. One advantage is to transit a decoded graphic code into a code that can be read by the UWB location system.

According to one embodiment, the system comprises on the one hand the pairing device and on the other hand the transmitter device, the pairing device comprising a first communication interface to transmit a data message to a remote server, said remote server comprising a memory for saving said pair of values. According to different embodiments, the system of the invention may comprise only the pairing device or the pairing device and a remote server or even the pairing device and at least one UWB transmitter device, or even all the equipment. The first communication interface is preferably a wireless interface, for example using the Wi-Fi protocol.

According to one embodiment, the system comprises on the one hand the pairing device and on the other hand the transmitter device, the pairing device comprising a second communication interface to send a data message encoding a data encoded in the graphic code to said transmitter device, said transmitter device comprising an interface to receive said data transmitted by the pairing device and a memory to save data specific to the graphic code, the transmitting device transmitting the pair of values in a UWB signal to a reception beacon. One advantage of this embodiment is to directly embed the decoded graphic code within the UWB communication system. In this case, the UWB transmitter device comprises the means for processing the numerical code decoded from the graphic code.

According to one embodiment, the transmitter device comprises a programmable component for saving data from the pairing device.

According to one embodiment, the zone delimiting a geometric contour of the support of the transmitter device comprises a surface of a transparent material. One advantage is to superimpose the first tag and the transmitter device which may take the form of a tag as well. It is then easier to access the information specific to the object.

According to an example, the zone may be an open zone of a support such as an opening. According to one example, the transmitter device comprises a rigid plate comprising a transparent window. One advantage is to superimpose the first tag and the transmitter device while guaranteeing access to the information of the two elements.

According to one embodiment, the system comprises the first tag, said first tag comprising a graphic code of the QR code, Flashcode, barcode, Datamatrix type.

According to one embodiment, the pairing device comprises means for attaching said transmitter device to a support of the first tag. One advantage is to have an equipment performing both functions: on the one hand, to pair the data of the first tag with that of the transmitter device and, on the other hand, to physically associate the first tag with the transmitter device.

According to one example, the transmitter device can be attached by screwing, nailing, or gluing. According to one example, the transmitter device comprises a collar for passing a wire, a connector or a clip. According to one example, the transmitter device comprises a face to affix a stickable or gluable face.

According to one embodiment, the pairing device forms a gun comprising a reading head for scanning the graphic code and a support for holding the pairing device to make it integral with said support of the first tag.

According to one embodiment, the pairing device in the form of a gun scans and applies the UWB transmitter device. In one embodiment, the pairing device performs the mechanical attaching action. The latter operation can be performed by strapping, nailing, stapling, gluing, etc.

The pairing device of the invention therefore makes it possible to scan and program the UWB transmitter device affixed to the first tag while attaching said UWB transmitter device to the first tag. According to one embodiment, the pairing device makes it possible to transmit via a network interface to a remote server the pairing data of the UWB transmitter device and the first tag in order to save them in a memory.

According to one embodiment, the first tag is a self-adhesive tag or an electronic paper.
According to one example, the screen of the first tag is of the electronic ink type.

According to one embodiment, the attaching support of the first tag is a self-adhesive tag or an electronic paper.

Figure 2:
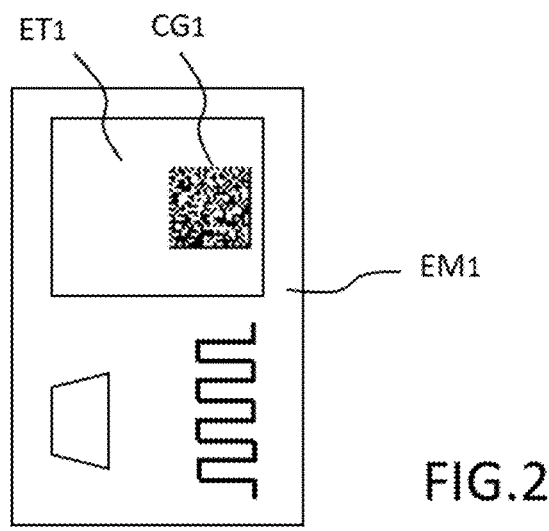

Other characteristics and advantages of the invention will become clearer on reading the following detailed description, with reference to the appended figures, that illustrate:

FIG. 1: an example embodiment of the invention comprising a first tag, a UWB transmitter device and a pairing device;

FIG. 2: an example embodiment of the invention comprising a first tag physically associated with a transmitter device thanks to the pairing device.

The notation "UWB" refers to the "Ultra Wide Band" frequency band. The notation "UHF" refers to the "Ultra High Frequency" band.

FIG. 1 shows an example embodiment of a first tag $ET_1$ comprising a graphic code $CG_1$ which may be, for example, a data matrix or a QR code or a flash code. This first tag $ET_1$, according to a use case, is already affixed to an object transiting from one location to another.

FIG. 1 also shows a UWB transmitted device noted as $EM_1$. The notation "UWB" stands for the "Ultra Wide Band" frequency band. The transmitter device $EM_1$ comprises a UWB radio transmission module comprising an antenna $ANT_1$ and a UHF radio reception module comprising an antenna $ANT_0$ to collect signals to electrically supply the UWB transmission module. Thus, the invention has every interest in ad hoc pairing of two pieces of equipment not previously configured to communicate with each other. The transmitter device $EM_1$ comprises a support $SUP_1$ perforated to leave the graphic code $CG_1$ visible when superimposed on the first tag.

The pairing device $D_A$ is shown in FIG. 1 with a handle for easier handling. In addition, the pairing device $D_A$ has a zone to keep the transmitter device $EM_1$ superimposed on the first tag $ET_1$. According to one embodiment, the pairing equipment DA comprises a means for attaching the transmitter device $EM_1$ to the object to which the tag $ET_1$ is already attached. Attaching can be achieved using a glue, adhesive, clip, staple or any other means.

The pairing device $D_A$ comprises radio communication means not shown to receive a UWB signal transmitted by the transmitter device $EM_1$. According to one example, the pairing device $D_A$ comprises a UHF transmitter to transmit a radio stream to the transmitter device $EM_1$ in order to cause the emission of a UWB signal from the transmitter device $EM_1$ when the latter is automatically triggered after receiving a sufficient level of UHF radio energy.

FIG. 2 shows the first tag $ET_1$ to which a transmitter device $EM_1$ is attached in a superimposed manner.

According to one embodiment, the transmitter device $EM_1$ comprises a probe to detect whether a tag is torn from the object to which the tag $ET_1$ is attached. If it is detached, an alert is generated automatically.

According to an alternative, when the probe detects a tear, a change in the physical state of the UWB transmitter device automatically results in the unpairing or disassociating of the data produced when pairing the UWB tag with the graphic code. One advantage is that the UWB transmitter device and the pairing data can no longer be used. Unpairing may result in erasing the data stored in a memory of the UWB transmitter device.

According to an alternative, if a tear is automatically detected by a physical change of state of the UWB transmitter device, a digital data can be automatically integrated into the UWB message transmitted by the UWB transmitter device. This data, which is then decoded by the reception beacons, makes it possible to trigger a detachment alarm which will be processed by a data server.

According to one embodiment, the unpairing between the UWB transmitter device and the first tag $ET_1$ can be performed from the pairing device $D_A$. In a sequence identical to the transmission of a data message from the pairing device DA to the UWB transmitter device, the pairing device D1 transmits an erasing instruction in order to erase the content of the UWB chip.

According to one embodiment, the pairing device $D_A$ comprises a radio interface to receive a radio signal transmitted by an RFID or NFC chip and a calculator to decode the radio signal data transmitted by said RFID or NFC chip. This embodiment of the pairing device $D_A$ is particularly interesting for pairing an RFID tag with a UWB device.

When the pairing device $D_A$ receives data from the RFID or NFC chip and the data transmitted by the UWB transmitting device, it is able to generate a data pair comprising data specific to the RFID or NFC radio signal and data specific to the UWB signal received. This pair allows the two devices to be paired.

When the pairing data is retransmitted to the UWB transmitter device, identical to the case described previously, an unpairing procedure can be performed in order to erase the pairing data saved in the UWB transmitter device.

Example Embodiment of a UWB Radio Transmitter Device

A UWB radio transmitter device may comprise an electronic medium comprising a modulator and a UWB antenna. The radio transmitter device transmits messages in the form of ultra-wideband radio pulse sequences, known as "UWB messages". Such UWB messages, formed by a sequence of radio pulses, are also referred to as "Ultra Wide Band-Impulse Radio" or UWB-IR. The transmitter device of the invention may be assimilated to a radio tag when it is intended to be affixed or attached to an object for localization.

The UWB transmitter device consists of a modulator and an antenna for transmitting a signal in the UWB band. The data is modulated by the modulator. According to one embodiment, a memory and a calculator may be integrated into the radio transmitter device to process, store, format the data to be transmitted in the UWB messages or signals.

According to an example embodiment, the UWB radio transmitter comprises a power supply in order to supply voltage to the different components. According to another embodiment, the power supply comes from a capacitor that is charged through the reception and collection of radio waves, for example in the UHF band.

According to one embodiment, the UWB radio transmitter device comprises a control module configured to control transmissions of UWB messages. According to one embodiment, the transmission period, transmission power, data coding, UWB modulation, etc. are configured in the control module to perform UWB message transmissions. According to one example, a stored energy threshold can trigger the transmission of a UWB message. According to one embodiment, the various functions listed may be supported by different components or be implemented by the same component.

According to one embodiment, the UWB radio transmitter device comprises a radio reception module to receive a radio wave stream. In this embodiment, a radio stream transmitting beacon allows the UWB radio transmitter device to collect radio frequency energy.

According to one embodiment, a radio stream transmitting beacon may be one or more wireless power supply stations distributed over the geographical zone covered by the UWB reception beacons. In this embodiment, the wireless power supply stations remotely supply the tags 20 with electrical energy. According to one embodiment, the transmitter beacons, also known as "wireless power supply stations" or UHF generator, are separate from the receiver beacons. However, there is nothing to exclude, according to other examples, having one or more said wireless power supply stations that are integrated into one or more UWB receiver beacons, such that at least one equipment of said position estimation system is both a wireless power supply station and a receiver beacon.

According to the embodiment, the UWB transmitter device comprises a rectifier to convert the spectral power received by the radio receiver module into an electrical voltage or current. The converted energy can then be stored in an electrical storage unit, such as a capacitor. The electric storage unit thus acts as a battery to supply the energy required to transmit UWB messages. According to one example, the capacitor can be controlled electrically from an electrical setpoint generated by component or directly by itself when a charge level is reached.

According to one embodiment, the transmitter device of the invention could also power a sensor and/or a calculator, for example a microprocessor, which interface with the UWB modulator.

According to one embodiment, the UWB radio transmitter device comprises a simplex communication module. "Simplex" means that the communication module is only suitable for transmitting UWB messages but does not allow receiving UWB messages from other third-party equipment.

According to one example, the simplex communication module is in the form for example of an electrical circuit comprising equipment such as an antenna, an amplifier, a local oscillator, a mixer, an analog filter and any other equipment that may contribute to the transmission of UWB signals.

According to one example, the simplex communication module is configured to transmit UWB messages in a frequency band centered on 4 gigahertz (GHz) and/or centered on 7.25 GHz. However, there is nothing to rule out the possibility of frequency bands being centered on other frequencies.

UWB messages, transmitted as radio signals, have at a given moment an instantaneous frequency spectrum of a predetermined width, for example between 500 megahertz (MHz) and 2.5 GHz, which corresponds to radio pulses of durations ranging respectively between a few nanoseconds and a few tenths of nanoseconds.

In one embodiment, the simplex communication module is configured to transmit UWB messages using on/off radio pulse modulation ("On Off Keying" or OOK) to encode bits to be transmitted. This means that the values of the bits to be transmitted are encoded by the presence or absence of a radio pulse. For example, if at a given moment the bit to be transmitted is "1", then the simplex communication module transmits a radio pulse, whereas if the bit to be transmitted is "0", said simplex communication module does not transmit a radio pulse. Such measures are advantageous in that they make it possible to reduce the power consumption required to transmit a UWB message, since the transmission of bits to be transmitted at "0" consumes almost no electrical energy.

According to another embodiment, a modulation in radio pulse position ("Pulse Position Modulation" or PPM) can be implemented in the to method according to the invention. For example, by considering that the bits to be transmitted in the form of radio pulses are pulsed at a predetermined period Tc, then at each period Tc, the pulses are transmitted with an offset in relation to the period Tc, the value of said offset depending on the value of the bit to be transmitted.

According to one embodiment, each ultra-wideband radio pulse can be formed by multiplying a sinusoidal signal by a pulse envelope. In this case, the local oscillator forming the sinusoidal signal corresponding to the carrier frequency of the radio pulses can remain activated continuously over the duration of the UWB message, and the amplitude of said sinusoidal signal is modulated by said pulse envelope. Apart from the radio pulse transmission moments, the amplitude of the sinusoidal signal is modulated by a zero value signal.

The modulated signal obtained after amplitude modulation of the sinusoidal signal is then supplied at the input of the amplifier, which can also remain activated for the entire duration of the UWB message to be transmitted. By modulating the sinusoidal signal by a pulse envelope before amplifying, the radio pulses are formed before the amplifier. Said amplifier therefore no longer forms the radio pulses, but merely amplifies said previously formed radio pulses. Note that it is still possible to deactivate the amplifier between radio pulses to reduce the power consumption of the amplifier.

According to one embodiment, the control module includes one or more processors and storage means (magnetic hard disk, electronic memory, optical disk, etc.) in which a computer program product is stored, in the form of a set of program code instructions to be executed.

Alternatively or in addition, the controller contains programmable logic circuit(s) (FPGA, PLD, etc.), and/or specialized integrated circuit(s) (ASIC).

According to one embodiment, the control module comprises a set of means configured in software (specific computer program product) and/or hardware (FPGA, PLD, ASIC, discrete electronic components, etc.).

In order to reconstruct the position of a transmitter device, the server comprises means for performing:

A consistency check between each message received by a to plurality of reception beacons, the consistency corresponding to a difference in message arrival time less than a predefined threshold and;

A construction of the position of a transmitter device by a trilateration algorithm between the arrival times of the different UWB messages.

Such a method relies on the use of the different flight times of UWB messages transmitted by a transmitter device and received by each reception beacon.

In order to perform such an algorithm, according to an example, the system comprises a device for transmitting a clock that broadcasts synchronization data to the different reception beacons. Each beacon $B_1$, $B_2$, $B_3$ receives a synchronization signal from, for example, another system or a "master" beacon. The synchronization signal is, for example, a signal comprising a time marker distributed to each beacon, said signal being generated from a remote clock.

According to one embodiment, each beacon comprises a calculator for:

extracting at least one identification data from said radio tag;

computing a time-stamped information for receiving a message transmitted by the transmitter device, said time marker being generated from a clock and a synchronization message. In the latter case, each beacon includes, for example, an interface to receive said synchronization signal.

The invention claimed is:

1. A system comprising:
    a first tag comprising a graphic code,
    an ultra wide band (UWB) radio transmitter tag, the UWB radio transmitter tag comprising
        a UWB radio transmission module and,
        an ultra high frequency (UHF) radio reception module configured to collect signals to electrically power the UWB radio transmission module, and
    a pairing device configured to pair the first tag with the UWB radio transmitter tag, the pairing device comprising
        a reader configured to visually read the graphic code of the first tag,
        a UWB receiver configured to receive a UWB signal transmitted by the UWB radio transmitter tag, and
        a memory configured to save a pair of values comprising a data specific to the graphic code visually read by the reader and a data specific to at least one UWB signal received from the UWB radio transmitter tag,
    said UWB radio transmitter tag comprising a support delimiting a window allowing the reader to visually read the graphic code of the first tag when the UWB radio transmitter device covers the first tag,
    wherein the pairing device is configured to attach the UWB radio transmitter tag to the first tag.

2. The system according to claim 1, wherein the pairing device comprises a radio interface for receiving a RFID radio signal from an RFID chip and a calculator for decoding the data of said radio signal, the pairing device generating a second data pair comprising a data specific to the RFID radio signal and a data specific to the UWB signal received.

3. The system according to claim 1, wherein the pairing device comprises:
    an optical reader configured to decode a 1D or 2D graphic code, and
    means to attach said UWB radio transmitter device on a support of the first tag.

4. The system according to claim 1, wherein the pairing device comprises a first communication interface to transmit a data message to a remote server, said remote server comprising a memory to save said pair of values.

5. The system according to claim 1, wherein the pairing device comprises a second communication interface to send a data message in which an encoded data is encoded in the graphic code to said UWB radio transmitter tag, said UWB radio transmitter tag comprising an interface for receiving said data transmitted by the pairing device and a memory for saving the data specific to the graphic code, the UWB radio transmitter tag transmitting the pair of values in a UWB signal to a reception beacon.

6. The system according to claim 1, wherein the support comprises the window, the window being a surface of a transparent material.

7. The system according to claim 1, wherein said system comprises the first tag, the graphic code being a QRcode, a Flashcode, a barcode, or a datamatrix.

8. The system according to claim 7, wherein the first tag is a self-adhesive tag or an electronic paper and wherein an attaching support of the first tag is a self-adhesive tag or an electronic paper.

9. The system according to claim 1, wherein the pairing device comprises a directive UHF energy source configured to transmit sufficient energy to the transmitter tag to cause the transmitter device to transmit a UWB data message.

10. The system according to claim 1, wherein the window is an opening.

* * * * *